Patented Aug. 11, 1925.

1,549,313

UNITED STATES PATENT OFFICE.

DANIEL D. JACKSON, OF BROOKLYN, NEW YORK, JOSEPH D. SEARS, OF BLOOMFIELD, AND FREDERICK CONLIN, OF WESTFIELD, NEW JERSEY, ASSIGNORS TO JOHN T. PRATT, OF NEW YORK, N. Y., SAID JACKSON AND SAID SEARS AS JOINT TRUSTEES.

PROCESS OF DESULPHURIZING IRON, STEEL, AND FERRO-ALLOYS AND COMPOSITION OF MATTER FOR USE THEREIN.

No Drawing.   Application filed April 13, 1923. Serial No. 631,925.

*To all whom it may concern:*

Be it known that we, DANIEL D. JACKSON, residing in the borough of Brooklyn, city and State of New York, JOSEPH D. SEARS, residing in Bloomfield, county of Essex, and State of New Jersey, and FREDERICK CONLIN, residing in Westfield, county of Union, and State of New Jersey, citizens of the United States of America, have invented certain new and useful Improvements in Processes of Desulphurizing Iron, Steel, and Ferro-Alloys and Composition of Matter for Use Therein, of which the following is a specification.

This invention relates to a process of desulphurizing iron, steel, and alloys thereof, and to compositions of matter for use therein, and aims to provide improvements therein.

The use of alkaline compounds, notably caustic soda and sodium carbonate, for desulphurizing iron and steel has heretofore been proposed.

The use of caustic soda is disadvantageous on account of its deliquescence, the very thin fluidity of the slag, the very irritating vapors given off, and, in the case of cast iron, on account of the effect, discovered by us, of removing silicon from the iron.

The use of sodium carbonate is subject to the disadvantage that the mass thereof which it is necessary to use the obtain practical results, takes from the metal a quantity of heat which is disadvantageous as regards the pouring of the metal, especially when thin castings are to be made. The use of sodium carbonate is further subject to the disadvantage that it melts slowly owing to its powder or fine granular form.

We have discovered that a mixture of caustic soda and sodium carbonate results in a slag or liquid layer which is not so thin and hence difficult to handle and volatile, as a slag or liquid layer resulting from the use of caustic soda alone.

We have further discovered that if a mixture of caustic soda and sodium carbonate be melted together or fused, there results a substantially non-deliquescent composition, one which is safe for handling, which is quick-melting when brought into contact with molten metal, and which acts quickly to desulphurize the metal.

We have further discovered that if the fused mixture be chilled in cooling, the time required for melting when subsequently brought into contact with molten metal and for effecting the desulphurizing action is still further shortened. The chilling may be produced by pouring the molten mixture on to a cooled surface, such as a water-cooled drum.

The present invention therefore provides a process for desulphurizing, making use of caustic soda and sodium carbonate, in which the slag or supernatant liquid is thicker than that of caustic soda alone, and of sufficient fluidity for internal mobility and easy flow on the surface of the molten metal, and for pouring from the ladle after the pouring of the metal; in which desiliconizing is avoided, or lessened; in which only a moderate amount of heat is required to melt the caustic soda and sodium carbonate mixture, so that the metal may be allowed to stand in a ladle in contact with the mixture for a short time, 2–10 minutes, without cooling to an extent which interferes with the proper pouring thereof, and without the necessity in ordinary practice, of the metal being heated in the melting furnace or pot to a higher temperature than ordinarily practiced in the melting of iron and steel; and in which a good desulphurizing effect is obtained.

The invention further provides a composition of matter having the characteristics in use above set forth, and which is only slightly deliquescent and convenient and safe for handling. The composition is preferably in the form of lumps, flakes, or a cake, as a size somewhat above powder particles and larger, is found to very much facilitate the melting of the composition.

According to the present invention the mixture of caustic soda and sodium carbonate is first preferably fused, and then formed into cakes or into coarse broken pieces, the fused mixture preferably being chilled in the process of cooling. A flaky form analogous to so-called "peanut brittle" is the form in which the mixture has been found to give best results in practice. The fused and chilled mixture has a dense close-grained structure which has been found to facilitate its use and action, particularly as regards the time of action, extent of removal of the sulphur, and the character of the action during melting in contact with the molten metal. The mixture in the form of a cake or in the form of flakes, is placed in a ladle or other receptacle for the molten iron or steel, before, during, or after the running in of the metal, or otherwise brought into contact with the molten metal, and allowed to act. About three minutes is ordinarily sufficient time for the fused desulphurizing mixture to act, though a longer time may be necessary when other substances are used with the mixture, as for example silicon-alloys, which take longer to melt, as set forth and claimed in our Patent No. 1,535,227, granted April 28, 1925.

The preferable proportion of caustic soda to sodium carbonate according to our present experience is 70% soda ash and 30% caustic soda, or thereabouts, all factors considered. However, as small an amount as 5% caustic soda in the mixture is found to have important effects in increasing the activity of the mixture over the action of sodium carbonate alone. Moreover, this amount (5%) is sufficient to produce a satisfactory fusion of the composition.

With the sodium carbonate and caustic soda in about the proportion of 70% to 30% respectively and fused together, the irritation due to the vaporization of the caustic soda is not perceptible. The desiliconization is substantially checked. The desulphurization is efficient. The slag, while fluid, is not so thin as to prevent its removal by a skimming implement before the pouring of the metal. Also the melting of the desulphurizing mixture may be brought about by the heat of the molten metal without abstracting so much heat as to interfere with the pouring of the metal and its proper flow into molds, and ordinarily without the necessity of raising the melted metal to higher temperatures than usually employed.

The process has special advantages as applied to iron and steel for casting, as it affects the desiliconization of the iron or steel much less than other desulphurizing agents such as caustic soda alone, and has a strong enough desulphurizing action on poor and even the worst grades of melted pig iron and scrap iron to reduce the sulphur content to a percentage below that which is deemed objectionable in foundry practice.

Other proportions than those specifically mentioned and other procedures than those specifically given, may be adopted without departing from the idea of the invention. Moreover, it is understood that the invention may be generally applied to the desulphurizing of metals.

The application is in part a continuation of our application Serial No. 578,486, filed July 29, 1922.

The desulphurizing mixture comprising alkali-metal carbonates and alkali-metal hydroxids broadly, and the process of desulphurizing by means of these mixtures, is claimed in our co-pending application, Serial No. 538,423, filed February 22, 1922.

What we claim is:—

1. A process of desulphurizing comprising treating molten iron, steel, and ferro-alloys with a mixture of caustic soda and sodium carbonate, the sodium carbonate being present in sufficient proportion to substantially reduce the vapors given off by the caustic soda.

2. A process of desulphurizing according to claim 1, in which the mixture has been previously fused.

3. A process of desulphurizing according to claim 1, in which the mixture has been previously fused and chilled.

4. A process of desulphurizing according to claim 1, in which the caustic soda and sodium carbonate are mixed in substantially the proportions of 30% and 70% respectively.

5. A process of desulphurizing according to claim 1, in which the caustic soda and sodium carbonate are previously mixed in substantially the proportions of 30% and 70% respectively, and fused.

6. A process of desulphurizing according to claim 1, in which the caustic soda and sodium carbonate are previously mixed in substantially the proportions of 30% and 70% respectively, fused and chilled.

7. A process of desulphurizing according to claim 1, in which 5% or more of caustic soda is contained in the mixture.

8. A process of desulphurizing comprising treating melted iron, steel, and ferro-alloys with a mixture of caustic soda and sodium carbonate, the sodium carbonate being in sufficient proportion to the caustic soda as to substantially diminish the desiliconizing action of the mixture.

9. A process of desulphurizing comprising treating melted silicon-containing iron and steel for casting, with a mixture of caustic soda and sodium carbonate whereby the action which caustic soda has in desiliconizing is lessened, the sodium carbonate and the caustic soda being substantially in the proportion of 70% sodium carbonate to 30% caustic soda.

10. A process of desulphurizing according to claim 1, further comprising running the molten metal into a ladle or the like at ordinary running temperatures, melting the mixture by the heat of the molten metal, allowing the mixture to act for a short period, and pouring the metal while it is still fluid enough for running into molds.

11. A composition of matter for use in desulphurizing iron, steel and ferro-alloys, consisting of a fused mixture of sodium carbonate and caustic soda, said mixture having relatively little deliquescence, and when heated on molten metal not giving off objectionable quantities of irritating vapors.

12. A composition of matter according to claim 11, in which the mixture has been chilled after fusion.

13. A composition of matter according to claim 11, in which there is 5% or more of caustic soda.

14. A composition of matter for use in desulphurizing iron, steel and ferro-alloys, consisting of a fused mixture of sodium carbonate and caustic soda, said mixture being relatively non-deliquescent, and when heated on molten metal not giving off objectionable quantities of irritating vapors, said ingredients being substantially in the proportions of 70% sodium carbonate to 30% caustic soda.

In witness whereof we have hereunto signed our names.

DANIEL D. JACKSON.
JOSEPH D. SEARS.
FREDERICK CONLIN.